United States Patent [19]

Lovett et al.

[11] 4,026,691
[45] May 31, 1977

[54] MAKING A PELLETIZED GLASS BATCH FOR SODA-LIME GLASS MANUFACTURE

[75] Inventors: Joe Bryant Lovett, Sweeny; James Hinton Dickerson, Jr., Lake Jackson, both of Tex.

[73] Assignee: The Dow Chemical Company, Midland, Mich.

[22] Filed: Nov. 3, 1975

[21] Appl. No.: 628,037

[52] U.S. Cl. .................... 65/27; 65/134; 106/DIG. 8; 264/117
[51] Int. Cl.² .................. C03B 5/16; B01D 47/06; C03C 3/04
[58] Field of Search .......... 65/27, 134; 106/DIG. 8; 264/117

[56] References Cited

UNITED STATES PATENTS

| | | | |
|---|---|---|---|
| 3,555,133 | 1/1971 | Gentaz | 65/27 |
| 3,728,094 | 4/1973 | Bowman | 65/27 |
| 3,753,743 | 8/1973 | Kukuda et al. | 65/27 X |
| 3,760,051 | 9/1973 | Eirich et al. | 65/27 X |
| 3,914,364 | 10/1975 | Engelleither et al. | 264/117 |
| 3,956,446 | 5/1976 | Eirich et al. | 65/27 X |

FOREIGN PATENTS OR APPLICATIONS

| | | | |
|---|---|---|---|
| 1,814,624 | 1969 | Germany | 65/27 |
| 1,952,274 | 1970 | Germany | 65/27 |

*Primary Examiner*—S. Leon Bashore
*Assistant Examiner*—Frank W. Miga
*Attorney, Agent, or Firm*—Walter J. Lee

[57] ABSTRACT

This invention pertains to improvements in the manufacture of soda-lime glass from pelletized glass batch material in which a major portion of the alkali metal oxide flux material (e.g. $Na_2O$) in the final glass is derived from an alkali metal hydroxide (e.g. NaOH) and in which the alkali metal hydroxide is reacted with alkaline earth metal oxide source material during the preparation of the pelletized glass batch material. The improvements are obtained by reacting aqueous, concentrated, alkali metal hydroxide with at least a portion of the alkaline earth metal oxide source material (e.g. limestone) to form an aqueous slurry which contains the reaction products, then mixing with the slurry the remaining glass batch materials under conditions to assure thorough mixing and then pelletizing and heating the batch material at a temperature of at least about 145° C to assure substantially complete drying of the pellets and substantially complete reaction of the alkali metal hydroxide.

Pellets thus made produce a more consistent batch material for feeding into a melting vessel in which molten glass is formed. The invention provides not only a more efficient glass making process, but also provides for salvaging heat energy and chemical values from the effluent gases of the melting furnace, thereby abating pollution.

16 Claims, 1 Drawing Figure

MAKING A PELLETIZED GLASS BATCH FOR SODA-LIME GLASS MANUFACTURE

BACKGROUND OF THE INVENTION

The present invention pertains to the manufacture of soda-lime glass. Soda-lime glass has been well known for centuries and, historically, has been made by mixing together soda ash (sodium carbonate) as a source of $Na_2O$ flux, limestone (calcium carbonate) as a stablizing oxide, and sand (as the glass-former) along with minor amounts of the other ingredients, such as colorants, fining agents, modifiers, etc.

The use of "wet-batching" in soda-lime glass batches has been used for many years and generally employs attempts to pelletize or granulate the batch feed materials by wetting the mixed ingredients with water or aqueous solutions of caustic. When aqueous caustic is employed as a wet-batching ingredient, it is normally used in relatively small amounts, compared to the soda ash (sodium carbonate) in the batch; the soda ash, provides the major amount of the $Na_2O$ flux values in the final glass product.

Caustic has been reacted with aluminum oxide source materials for use in glass-making such as is shown in U.S. Pat. No. 3,846,143.

Caustic has been employed with the total glass batch (sand, limestone, minor ingredients) such as in U.S. Pat. No. 3,573,887 and U.S. Pat. No. 3,542,534.

The art believed to be most relevant in regards to reacting caustic with an ingredient in a glass batch formulation, as in the present invention, is believed to be art such as is shown in U.S. Pat. Nos. 3,726,697; 3,573,887; and 3,630,673.

In U.S. Pat. No. 3,726,697 it is taught that an alkali metal hydroxide is reacted with an alkaline earth metal oxide source material in a granulated glass batch material. Also the patent teaches that flue gases from the glass melting tank may be used in the drying of the glass batch granules.

In U.S. Pat. No. 3,573,887 it is taught that an alkali metal hydroxide is reacted with an alkaline earth metal oxide source material in a glass batch mixture which is formed into a elongated shape and passed directly through a melter to form a continuous strand of molten glass.

In. U.S. Pat. No. 3,630,673 it is taught the reaction of alkali metal hydroxide (e.g. NaOH) with an alkaline earth metal oxide source material (e.g. $CaCO_3$) gives a product having the formula $Na_2Ca(OH)_4$ which is useful in a glass batch material.

Other patents illustrative of the state of the art in efforts to prepare improved glass batches, (such as by pelletizing or granulating) are, for example U.S. Pat. Nos. 3,545,988; 3,489,578; 3,001,881; 3,234,034; and 3,081,180.

For a concise, relatively recent treatise on the commercial making of glasses, including soda-lime glasses, it is suggested that the *Kirk-Othmer Encyclopedia of Chemical Technology*, Vol. 10, 1966 be consulted.

It is also known to pre-heat glass batch materials on their journey to the melting pot by using hot flue gas as is shown e.g., in U.S. Pat. Nos. 3,172,648 and 3,459,411. In actual practice it is found to be difficult to avoid particle classification when the glass batch material is passed countercurrently through the flow of hot gas since the gas tends to entrain small particles more than large particles and can separate fine material from the glass batch material.

In the preparation of glass batch material wherein an aqueous alkali metal hydroxide is reacted with an alkaline earth metal oxide source material, it is difficult to assure complete reaction when other materials are present because some of the aqueous alkali metal hydroxide coats the other material and is not in contact with enough of the alkaline earth metal oxide source material to assure complete reaction. On the other hand, if the reaction between the alkali metal hydroxide and the alkaline earth metal oxide source material is carried to completion prior to mixing with the other glass batch materials, then it is difficult to assure that the reaction product is evenly distributed amongst the other particles. The reaction of the aqueous alkali metal hydroxide and the alkaline earth metal oxide source is driven to completion by removing water as the reactants are heated; the reaction is somewhat reversed if water is added back to the reaction product, thereby reforming some alkali metal hydroxide.

It would be a rather tedious and energy-consumming process to completely react the alkali metal hydroxide with the alkaline earth metal oxide source material to obtain a substantially dry reaction product (i.e., having essentially no unreacted alkali metal hydroxide), then mix the reaction product with the remaining glass batch ingredients, adding water to enable pelletizing (which would reverse the reaction by hydrolysis), and then re-heating the pellets at a temperature sufficient to not only dry the pellets but to regain complete reaction of the alkali metal hydroxide and the alkaline earth metal oxide source material.

There is a need for a process by which the reaction of the alkali metal hydroxide and the alkaline earth metal oxide source material can be carried to completion in a substantially uniform manner throughout the total glass batch material while reducing the energy requirements. There is also a need for an improved method of preparing non-decrepitating glass batch pellets of uniform composition. There is also a need for conserving heat energy and for reducing power requirements in the overall process of preparing the pellets and in melting the pellets to form molten glass. There is a further need for abating pollution of the ambient atmosphere normally encountered in glass making operations when particulate matter is carried from the melting operation by gases which flow from the melting operation.

It is an object of this invention to prepare glass batch pellets in which substantially all of the alkali metal oxide values are present as a reaction product of alkali metal hydroxide and alkaline earth metal oxide source material.

It is also an object to prepare the glass batch pellets in such a manner that the reaction product of alkali metal hydroxide and alkaline earth metal oxide source material is substantially uniformly distributed throughout the pellets.

It is another object to utilize the waste heat from a glass batch material during the pellet-forming operation to attain the desired reaction between the alkali metal hydroxide and the alkaline earth metal oxide source material.

Another object is to utilize the waste heat coming from the glass melting operation to pre-heat the batch pellets, thereby salvaging heat energy and reducing the power requirements for maintaining the desired temperature in the melting pot.

It is still another object to utilize the glass batch pellets being fed to the melting operation as scrubbers for entrained fines which are present in the hot gases exiting the glass melting operation.

These and other objects are attained in the practice of the invention described and claimed herein.

SUMMARY OF THE INVENTION

In a process for preparing soda-lime glass batch pellets containing requisite amounts of a silica-source material (glass former), an alkaline earth metal oxide source material (stabilizing oxide) and an alkali metal oxide source material (flux) wherein the alkali metal oxide source is predominantly an alkali metal hydroxide which has been substantially reacted with the alkaline earth metal oxide source material during the pellet-forming process, it has been found that improvements are attained by reacting molten, aqueous alkali metal hydroxide with at least a portion of the alkaline earth metal oxide source material to form a slurry and then thoroughly admixing the remaining ingredients, either slowly or stepwise, with the slurry to obtain a moist batch mixture which is then pelletized and dried. Conveniently, the heat energy needed for drying the pellets and for heating the concentrated aqueous alkali metal hydroxide is furnished by the hot gases exiting from the glass batch melting operation.

DETAILED DESCRIPTION OF THE INVENTION

Figure 1:
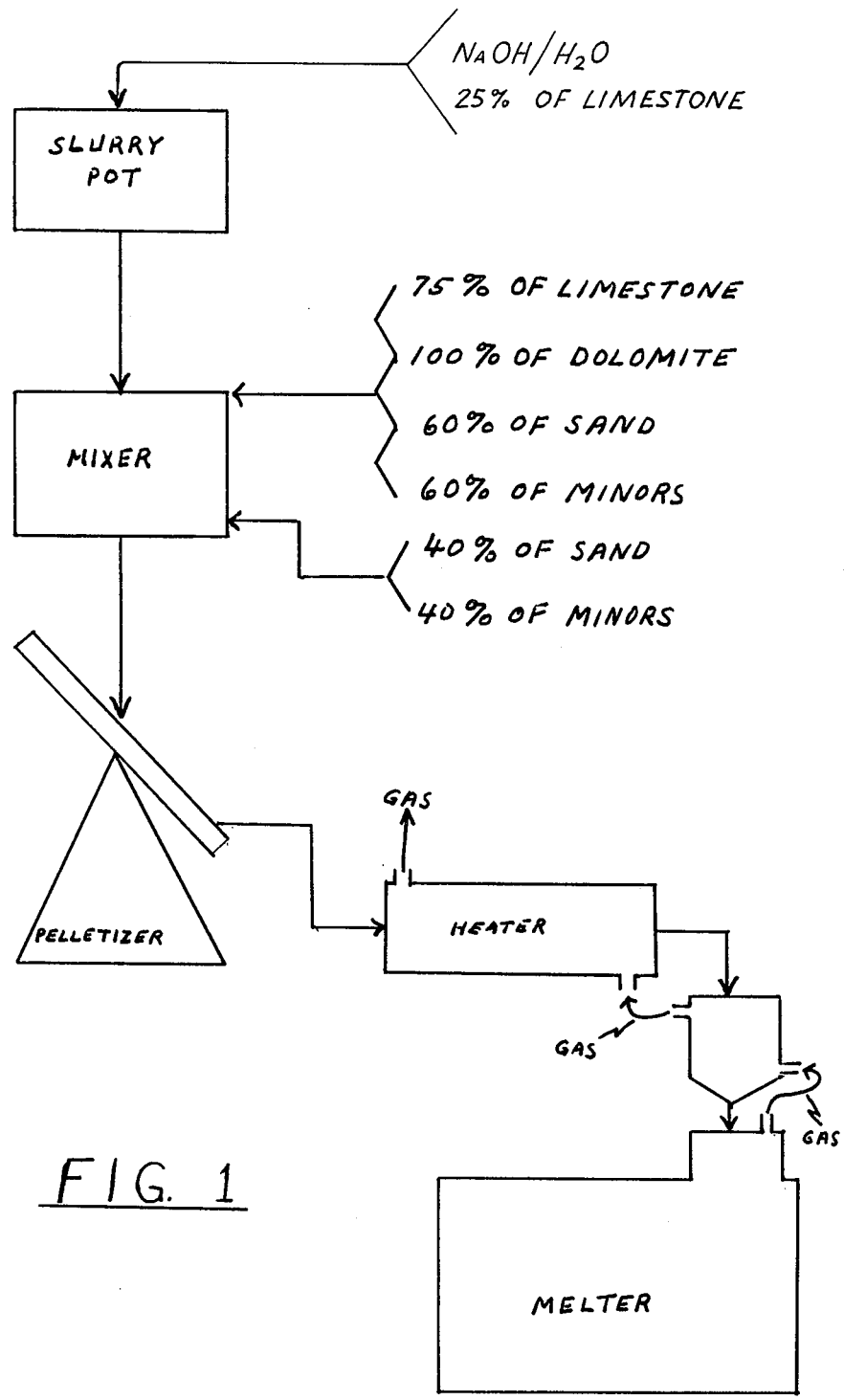

Throughout this disclosure, the expression "soda-lime glass" shall refer to glass prepared by melting together requisite amounts of:
a. a glass-former material which is, principally, a silica-source material but which may contain minor amounts of other metal oxide source materials and impurities;
b. a stablilzer-oxide source material which is, principally, an alkaline earth metal oxide source material which will supply, in the final glass product, CaO and/or MgO but which may contain minor amounts of other metal oxides and impurities;
c. an alkali metal oxide flux source material which is, principally, an alkali metal hydroxide which yields alkali metal oxide values in the final glass product, but may also include impurities and minor amounts of other alkali metal compounds which yield alkali metal oxides, such as sodium carbonate (soda ash) and sodium chloride (present with Na sulfate in "salt cake");
d. fining agents and/or modifying agents which yield metal oxide values in the final glass product, such as sulfates, nitrates, peroxides, chlorates, halides, perchlorates, ammonium salts, and the like. One of the most commonly used fining agents in preparing soda-lime glasses is sodium sulfate which releases gaseous $SO_3$.

By the expression "requisite amounts" it is meant amounts which are suitable in preparing a glass product such as commercially available soda-lime glasses. In such glasses, the $SiO_2$ (film-former) content is generally within the range of about 60 to about 85% (by weight), the alkali metal oxide (stabilizer oxide) is generally about 10 to about 20%, and the other metal oxides (modifiers, colorants, etc.) are generally about 1 to about 5%.

In the practice of the invention the requisite amount of alkali metal hydroxide (as an aqueous solution of a concentration of at least 52%, generally about 58% to 75%) is heated to a temperature in the range of about 80° C to about 160° C and is reacted with at least a portion (generally about 10% to about 100%) of the alkaline earth metal oxide source material for a period of time (generally from about 10 minutes to several hours) to provide a relatively thick slurry.

To the slurry is carefully added, with thorough mixing, the remaining glass batch materials which include any alkaline earth metal oxide source materials not already employed in the slurry, the silica-source material, and any modifiers or fining agents desired. Such careful and thorough mixing is necessary to avoid uneven distribution of the slurry ingredients throughout the batch material.

To assure thorough mixing and obtain uniform distribution of the slurry throughout the batch material, it is preferred that:

1. the batch materials be thoroughly pre-mixed before being mixed with the slurry;
2. the slurry be added to a portion of the batch materials, then the remaining batch materials be added to that; and
3. the mixing of the batch materials with the slurry be done slowly or stagewise in order to substantially thoroughly mix each portion prior to addition of the subsequent portion.

The thoroughly mixed batch materials, still moist enough for agglomeration are pelletized in any convenient manner. A rotating inclined disc pelletizer is particularly applicable because as the pellets are formed and become larger by accretion, the larger pellets migrate to the outer perimeter where they tumble off and the smaller pellets remain on the disc to be contacted with more batch mixture and to grow by further accretion. Other pelletizing devices or tumblers may be employed, such as a rotary kiln vessel. At this stage, the pellets still contain some water, therefore the complete reaction of the alkali metal compounds to obtain anhydrous products with the alkaline earth metal oxides source material has not been reached. The principal anhydrous reaction product is $Na_2Ca(OH)_4$ as is taught in U.S. Pat. No. 3,630,673.

It is this anhydrous product, obtained by reacting the alkali metal hydroxide and the alkaline earth metal oxide source material, which is desired to be uniformly dispersed throughout the glass batch pellet where it serves as a strong binder as well as the principal source of the alkali metal oxide values in the final glass product.

The pellets, still containing some water, have not yet reached the point at which the desired strong pellets have been achieved, but are strong enough for further handling in a drying operation. The pellets are subjected to heat to remove the water and drive the reaction of the alkali metal hydroxide to completion. The drying is conveniently and preferably done using sensible heat contained in effluent gases from the glass melting operation in order to help salvage heat energy and chemical values in the effluent stream which might otherwise be emitted to the atmosphere. The temperature to which the pellets are taken to effect complete drying is at least about 145° C (the approximate boiling point of 52% caustic). Preferably the temperature of the pellets is taken to about 318° C or more (the approximate melting point of anhydrous caustic). If the pellets are not substantially thoroughly dried and the alkali metal hydroxide not substantially completely reacted, then decrepitation of the pellets and caustic attack of the refractory liner of the glass furnace may occur. Decrepitation occurs when water is instantaneously converted to steam as the pellet reaches the melter and can occur in the feeder to the melter when the pellets come into contact with the extremely hot effluent gases or can occur when moist pellets come into contact with the molten glass, thereby creating "fines" which may be swept from the vessel by the effluent gases.

The pellets may be stored for later use, if desired, or may be fed directly through a conduit to a glass melting furnace. Preferably the pellets are fed to the melter countercurrently to the hot effluent gases in order to scrub chemical values (fines, reactive gases, etc.) from the gases and to salvage heat energy. Salvaging the heat energy in this manner not only substantially avoids wasting of sensible heat but also gives energy savings in the melter itself by having the pellets pre-heated as they enter the melter.

The scrubbing of effluent chemical values from the effluent gases is an important advantage, especially when bothersome fining gases, such as $SO_3$ or $NO_3$, are present. The alkali metal and alkaline earth metal values in the pellets of the present invention are capable of reacting with fining gases, thereby re-cycling them to the furnace. Once this re-cycle pattern is established, it is possible to continue operation employing only small amounts of "make-up" fining agent in the batch preparation.

Aside from the heat values scrubbed from the effluent gases leaving the furnace by way of the counter-current feeding of the pellets through the gases and the use of the hot effluent gases to obtain drying and reaction during the pelletizing operation, the remaining heat in the effluent gases is conveniently employed, if desired, to pre-heat any of the starting materials. For instance, if the aqueous alkali metal hydroxide has become cool enough to cause it to "freeze", the heat from the furnace gases is useable to pre-heat the metal hydroxide.

It will be readily apparent that the procedure outlined above may be varied somewhat depending on whether the operation is too be performed continuously, batchwise, or by continuous-batching. The type and size of the equipment employed will also depend on which type of operation is desired as well as on the production rate desired. For instance, it may be desired to employ a "surge tank" between the pelletizer and the furnace in order to provide for situations where the flow of pellets to the furnace may need to be slowed, stopped or otherwise regulated. It may be desired to employ a by-pass whereby the flow of pellets can be diverted in order to slow or stop the flow into the furnace.

As discussed hereinbefore, one of the advantages of the present invention is that the alkali metal hydroxide is more completely reacted and is more uniformly distributed throughout the batch pellet. By forming a slurry of the alkali metal hydroxide and at least a goodly portion of the alkaline earth metal oxide source material, these two reactants are homogenously combined and are somewhat reacted together. The reaction is not complete at this stage because of the presence of water. This homogenous mixture is then combined with the remaining batch materials so that the water, needed for agglomeration of the batch into pellets, is uniformaly distributed over the solid particles, yet the water carries both alkali metal values and alkaline earth metal values. As the pelletized batch material is heated to a temperature high enough to drive the reaction of the alkali metal hydroxide to completion, the water is driven off and reverse reaction (hydrolysis) is avoided.

It is not desired that the invention be limited in any way by the following hypothesis and it is offered only as a possible explanation of the good results obtained by the simultaneous reacting and drying at high temperature. It is postulated that if the drying is done at a temperature below the maximum temperature at which hydrolysis of the reaction product occurs, the reactants can become dry without being completely reacted and this would leave unreacted alkali metal hydroxide and this is undesirable. If, however, the drying is done at a temperature above that at which hydrolysis can occur, then the reaction of the alkali metal hydroxide is complete and substantially no unreacted alkali metal hydroxide is present in the dried pellet.

Another way of explaining the reaction is to postulate that at tempertures high enough to reach, or at least approach, the boiling point of the aqueous caustic, water is driven off thereby concentrating the caustic and driving toward completion the reaction of the caustic with the alkali metal oxide source material; since the water is steamed out as it is released from the caustic the tendency of the reaction product to hydrolyze is averted.

The reaction product of the alkaki metal hydroxide and the alkaline earth metal oxide source material is a stronger "cement" for the batch pellet than is dried, unreacted alkali metal hydroxide and this is a further advantage to having the alkali metal hydroxide completely reacted.

The embodiments described hereinafter are to illustrate the practice of the present invention, but it will be readily apparent to practitioners that variations of the embodiments may be made without departing from the invention described and claimed. The alkali metal hydroxide, sometimes referred to herein as "caustic", is generally NaOH, but may at times contain minor amounts of other alkali metal hydroxides. The concentration of the aqueous caustic may be from about 52% to about 75%, preferably about 58% to 75%, most preferably about 70% to about 75%.

The alkaline earth metal oxide source material includes, principally, limestone ($CaCO_3$), lime (CaO), dolomite ($MgCO_3.CaCO_3$), calcined dolomite ($MgO\cdot CaO$), $CaCO_3$, $Ca(OH)_2$, $Mg(OH)_2$, or mixtures of two or more of these; the source material may be hydrated or dehydrated, but preferably is relatively dry. Also alkali metal and/or alkaline earth metal values may be derived from minerals such as feldspar, syenite, barytes, salt cake, and the like. Other minor ingredients may be other metal compounds of, e.g., iron, selenium or cobalt or may be sodium sulfate, barium sulfate, carbocite, decolorizers or surfactants.

Ordinarily, the major portion of the alkaline earth metal value in the final glass product is calcium and the major portion of the alkali metal value is sodium.

The attached drawing, FIG. 1, is a flow-sheet diagram showing one embodiment, in general, of the present invention for the making of pelletized glass batch material. The diagram shows the addition of aqueous NaOH, pre-heated to about 80°–90° C, being supplied to a slurry pot where it is mixed with 25% of the desired total amount of limestone. The mixture is brought to about 110°–140° C, with mixing, and it forms an aqueous slurry containing the reaction product, $Na_2$-

$Ca(OH)_4$, along with $Ca(OH)_2$ (slaked lime), $Na_2CO_3$ (which forms) and probably a small amount of unreacted NaOH and $CaCO_3$. The slurry is then transferred to a mixer where there is added to it a mixture containing 75% of the desired limestone, 100% of the desired dolomite, 60% of the desired sand, and 60% of the desired minor ingredients. After a few minutes of mixing to assure good distribution of the slurry throughout the mixture, the remaining 40% of the sand and remaining 40% of the minor ingredients are thoroughly mixed in and mixing continued for a few minutes to assure good distribution of the slurry. At this point the mixture is grainy, moist and pelletizable and is fed to a rotating inclined disc for pelletizing and to begin the heating and drying. The pellets leaving the pelletizer (generally still a little moist) are then passed through a heating cycle to attain a temperature of at least about 145° C, preferably at least about 318° C, to obtain substantially complete reaction of the NaOH and to thoroughly dry the pellets. Conveniently, and preferably, the heating and drying is done with hot effluent gases leaving the glass melting furnace in order to salvage heat from the gases, to scrub entrained chemical values from the gases, and to provide preheated pellets to the furnace.

The dry, reacted pellets are suitable for feeding directly into the melting vessel. Preferably the feeding is done in such a manner that the hot effluent gases leaving the melting vessel are contacted with the pellets in order to scrub out entrained fines carried by the effluent gases and to salvage sensible heat from the effluent gases.

The pellets are found to be strong and do not decrepitate when contacted with hot effluent gases or when contacted with molten material in the melting vessel. The resulting final glass product is found to be homogeneous and of high quality and contains much less imperfections (seeds, cords, grains, etc.) than when conventional glass batch material is held in the melter for the same period of time.

EXAMPLE 1

A slurry is prepared by mixing and heating at 110° C about 28.15 lbs. of NaOH, about 11.64 lbs. of $H_2O$ and about 15.11 lbs. of fine limestone ($CaCO_3$).

A mixer is provided which contains about 6.6 lbs. of fine limestone, about 19.3 lbs. of dolomite, about 77.65 lbs. of sand (silica), about 264 grams of baryte, about 131 grams of salt cake (technical grade sodium sulfate) and about 21 grams of other minor ingredients. The material in the mixer is thoroughly blended. The mixer employed is a rotating tub type with stationary blades.

The slurry is then added to the blended materials in the mixer and thoroughly mixed in order that the materials all be substantially uniformly contacted with the slurry.

There is then added to the mixture the following pre-blended materials: about 51.87 lbs. of sand, about 176 grams of barytes, about 87 grams of salt cake, and about 16 grams of other minor ingredients. The ingredients are all thoroughly mixed to assure substantially uniform contact of the slurry with all the materials.

The moist mixture is then tumbled on an inclined rotating disc where it becomes pelletized. The so-formed pellets are contacted with hot effluent gases from a glass furnace operation, thereby scrubbing out entrained fines and sensible heat from the effluent gas. The contacting with the hot effluent gas is conveniently done in a traveling bed type vessel. The pellets become heated to a temperature above about 145° C and the pellets become dry and the caustic becomes substantially completely reacted, as shown by analysis.

The dry, reacted pellets are then fed into a feeder device for subsequent conveyance to a melting vessel. In the feeder device the pellets are pre-heated by being contacted with hot effluent gases from the melting operation; this salvages sensible heat energy and entrained fines carried by the effluent gases from the melting operation. The pellets, then conveyed to the melter, are found to become substantially homogenously melted to a batch-free, high quality molten glass product in significantly less time and with less energy requirement than is normally required in presently existing commercial soda-lime glass processes.

In other experiments it is found that the conditions and ratios of the above example can be varied without departing from the advantages obtained. The aqueous caustic may be within the concentration range of about 52%–75%, preferably about 58%–75% most preferably about 70%–75%. The alkaline earth metal oxide source material may contain more or less MgO source material than is illustrated above, but it is preferred that the alkaline earth metal oxide source material contain a major amount of CaO source material. In place of limestone, one may use calcined limestone (lime), dolomite, calcined dolomite (dolime), hydrated lime, hydrated dolime, or other sources of the oxides, hydroxides, or carbonates of alkaline earth metals. The amount of the alkaline earth metal oxide source material which is used in preparing the slurry may be from about 10% to about 100% of the requisite amount; the percentage not used at this point is added later along with the remaining glass batch ingredients. The remaining glass batch materials may be relatively slowly added, incrementally added, or added stagewise as in the example above; it is important that, to get the best results, the batch materials and the slurry be substantially uniformly mixed before a substantial amount of the reacting and drying has been done. For stagewise addition, it is generally convenient and preferred to employ about 40–60% of the blended batch materials in the first stage, then add the remaining amount in the second stage.

Even though the present disclosure shows a preference for using the heat of the hot effluent gases from the melting operation to heat the pellets, it is readily apparent that heat from other sources can be used.

We claim:

1. A process for preparing a pelletized glass batch material suitable for soda-lime glass manufacture, said process comprising the sequential steps of reacting molten, concentrated, aqueous alkali metal hydroxide with an alkaline earth metal oxide source material by admixing them at a temperature in the range of about 80° C to about 160° C thereby forming an aqueous slurry containing the so-formed reaction product, thoroughly admixing with the so-formed aqueous slurry, a mixture of alkaline earth metal oxide source material, silica, and desired minor processing ingredients, said admixing being done under conditions to substantially assure thorough distribution of the slurry materials throughout the mixture, pelletizing the mixture, and heating the so-formed pellets at a temperature of at least about 145° C for a time sufficient to substantially dry the pellets and substantially completely react the alkali metal hydroxide.

2. The process of claim 1 in which the concentrated, aqueous alkali metal hydroxide is an aqueous solution of sodium hydroxide of a concentration in the range of about 58% to about 75%.

3. The process of claim 1 in which the alkaline earth metal oxide source material is predominantly a calcium oxide source material.

4. The process of claim 1 in which the alkaline earth metal oxide source material is at least one of the compounds selected from the group consisting of oxides, carbonates, and hydroxides of magnesium and calcium.

5. The process of claim 1 wherein the pellets are heated at a temperature of at least about 318° C for a time sufficient to substantially dry the pellets and substantially react the alkali metal hydroxide.

6. The process of claim 1 wherein the temperature at which the alkali metal hydroxide is reacted with the alkaline earth metal oxide material is in the range of about 110° C to about 130° C.

7. The process of claim 1 in which the reaction of caustic with alkaline earth metal oxide source material is carried out for a period of from about 10 minutes to several hours.

8. The process of claim 1 in which the minor processing ingredients comprise at least one of the group of fining agents and modifiers consisting of sodium sulfate, feldspar, syenite, salt cake, barium sulfate, carbocite, barytes, cobalt compounds, selenium compounds, decolorizers, and surfactants.

9. The process of claim 1 wherein the pelletizing is performed by feeding the mixture of glass batch material to a rotating inclined disc where the material is tumbled and agglomerated into discrete pellets large enough to migrate to the lower half of the outer edge of the disc.

10. The process of claim 1 in which the pelletized glass batch material is intimately contacted with, and heated and dried by, the effluent gases from a glass batch melting operation.

11. The process of claim 1 in which at least a portion of the minor processing ingredients in the pelletized glass batch material comprises an amount of alkali metal sulfate which amount is subsequently supplemented by reaction of a minor portion of the alkali metal values in the pelletized batch material with $SO_3$ values in the effluent gases exiting from a glass batch melting operation by contacting the pelletized batch material with the hot waste gases which exit from a glass batch melting operation.

12. A process for preparing a pelletized glass batch material suitable for melting to form soda-lime glass, said process comprising the sequential steps of reacting a requisite amount of a molten, concentrated, aqueous caustic with at least a portion of a requisite amount of an alkaline earth metal oxide source material by admixing them at a temperature in the range of about 80°–160° C thereby forming an aqueous slurry containing reaction products, mixing with the so-formed aqueous slurry a first mixture comprising at least a portion of a requisite amount of an alkaline earth metal oxide source material, silica-source material, and desired minor processing ingredients wherein the alkaline earth metal oxide source material is in an amount which, when added to the amount used in forming the slurry, is sufficient to supply the requisite amount needed to form a soda-lime glass, the silica-source material being an amount to supply about 40 to about 60 percent of the requisite amount needed to form a soda-lime glass, and the amount of minor processing ingredients being an amount to supply about 40 to about 60 percent of the requisite amounts needed in the forming of the soda-lime glass, continuing the mixing of the slurry and the said first mixture while supplying to the mixing operation a second mixture comprising the remaining percentages of the requisite amounts of silica-source material and the minor processing ingredients, continuing the mixing for a period of time to substantially assure complete mixing of the glass batch ingredients, pelletizing the so-formed mixture of glass batch ingredients, and heating the pellets to a temperature of at least about 145° C for a time sufficient to substantially dry the pellets and substantially react the caustic.

13. The process of claim 12 in which the aqueous caustic is an aqueous solution of sodium hydroxide of a concentration in the range of about 58% to about 75%.

14. The process of claim 12 in which the alkaline earth metal oxide source material is predominantly a calcium oxide source material.

15. The process of claim 12 in which the alkaline earth metal oxide source material is at least one of the compounds selected from the group consisting of oxides, carbonates, and hydroxides of magnesium and calcium.

16. The process of claim 12 wherein, in the first mixture, the percentage of the requisite amount of alkaline earth metal oxide source is in the range of about 10 to about 90, the percentage of the requisite amount of silica-source material is in the range of about 40 to about 60, and the percentage of the requisite amounts of minor processing ingredients is in the range of about 40 to about 60.

* * * * *

UNITED STATES PATENT AND TRADEMARK OFFICE
CERTIFICATE OF CORRECTION

PATENT NO. : 4,026,691
DATED : May 31, 1977
INVENTOR(S) : Joe Bryant Lovett et al.

It is certified that error appears in the above-identified patent and that said Letters Patent are hereby corrected as shown below:

Col. 1, line 10 "stablizing" should be spelled --stabilizing--.

Col. 1, line 39 after the word "that" please add --the--.

Col. 3, line 37 "stablizer-oxide" should be spelled --stabilizer-oxide--.

Col. 5, line 48 after the word "tank" please insert the phrase --or "hold-up tank"--.

Col. 5, line 67 please delete the "a" from aly.

Col. 6, line 20 "tempertures" should be spelled --temperature--.

Col. 6, line 28 "alkaki" should be spelled --alkali--.

Col. 6, line 48 after "CaCO$_3$" please insert --MgCO$_3$--.

Col. 10, line 24 delete the word "the", second occurrence, and insert -- a --.

Signed and Sealed this

First Day of November 1977

[SEAL]

Attest:

RUTH C. MASON
Attesting Officer

LUTRELLE F. PARKER
Acting Commissioner of Patents and Trademarks